UNITED STATES PATENT OFFICE.

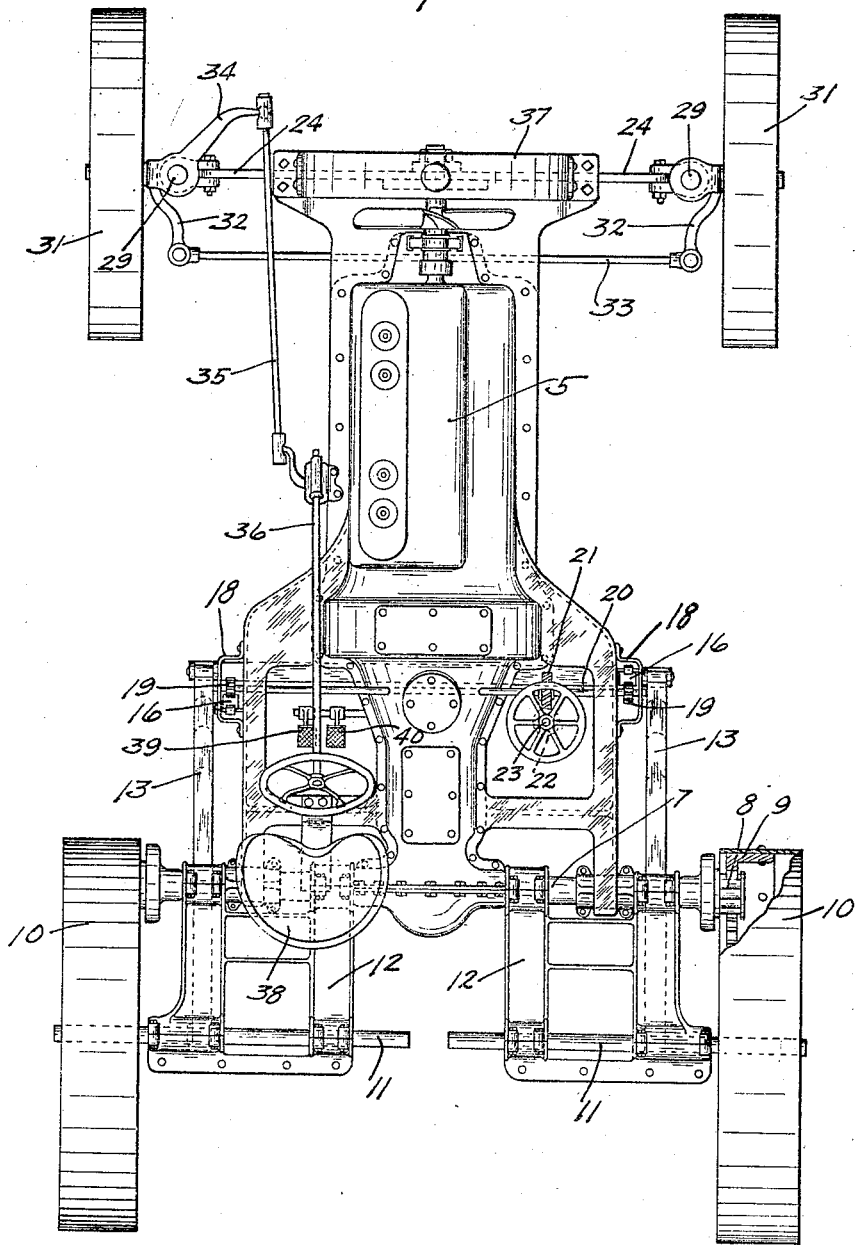

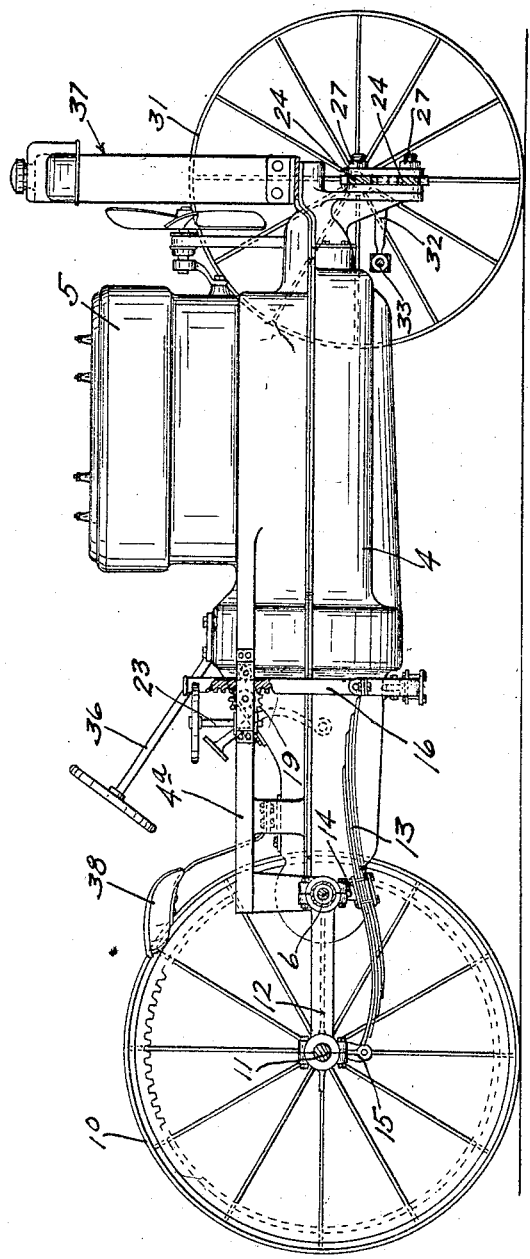

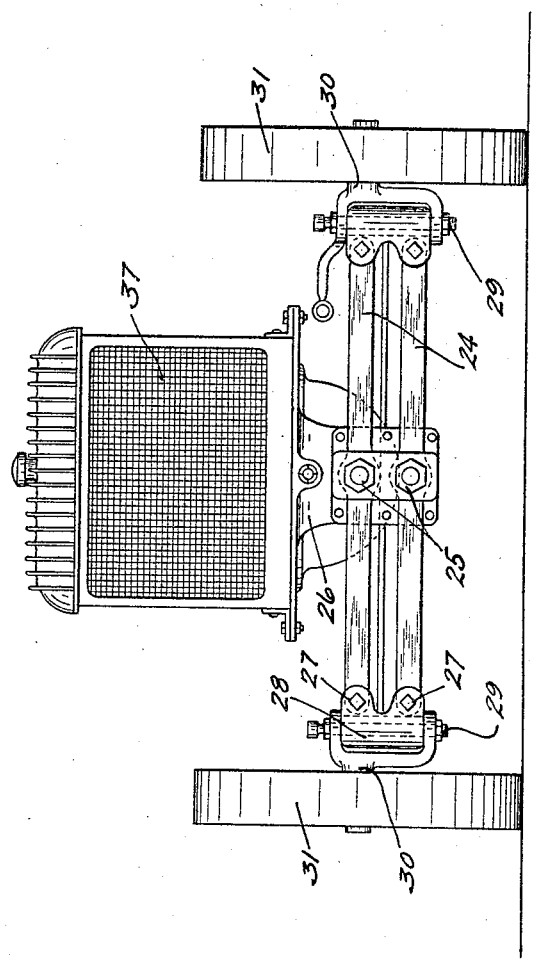

LOUIS C. ERBES, OF ST. PAUL, MINNESOTA.

TRACTOR.

1,305,448. Specification of Letters Patent. Patented June 3, 1919.

Application filed April 19, 1918. Serial No. 229,626.

*To all whom it may concern:*

Be it known that I, LOUIS C. ERBES, a citizen of the United States, residing at St. Paul, in the county of Ramsey and State of Minnesota, have invented certain new and useful Improvements in Tractors; and I do hereby declare the following to be a full, clear, and exact description of the invention, such as will enable others skilled in the art to which it appertains to make and use the same.

My invention relates to tractors, this term being used in a liberal sense to include motor-propelled vehicles; but particularly the invention is directed to the improvement of that type of tractor generally known as a farm tractor and which is adapted, among other things, to be used for drawing gang plows.

In plowing, it is customary to have one of the traction wheels run in the furrow and when the tractor has four wheels, it is also common practice to run one of the front wheels also in the furrow. As an important feature, this invention provides means for raising and lowering one of the tractor wheels in respect to the other, without disturbing the transmission connections to the traction wheels. The invention also involves a front axle structure, whereby the front wheels will be kept perpendicular, regardless whether running on level ground or when running with one front wheel in the furrow. The invention also involves other important features, which will hereinafter appear.

In the accompanying drawings, which illustrate the invention, like characters indicate like parts throughout the several views.

Referring to the drawings,

Figure 1 is a plan view of the tractor;

Fig. 2 is a side elevation of the same; and

Fig. 3 is a front elevation of the tractor.

In the construction illustrated, the main frame of a tractor is in the form of a casting 4, which affords not only the main frame, but also the base and crank shaft chamber of a multi-cylinder combustion engine 5. This engine, through the usual connections, including a differential gear, will drive a transversely divided jack-shaft 6, the sections of said shaft being journaled in suitable bearings on the rear portion of the said main frame casting and being surrounded by a tubular shaft casing 7, that is rigidly secured to the said casting. At their projecting ends, the sections of the shaft 7 are provided with pinions 8 that mesh with large internal gears 9 secured within the traction wheels 10. These traction wheels 10 are secured to the outer ends of the sections of a centrally divided axle 11; and these axle sections 11 are journaled in the free rear portions of radius arms 12. These radius arms 12, as shown, are of rectangular frame-like formation provided with prongs that are pivoted on the axle casing 7, with freedom for vertical pivotal motion thereon. Obviously, these frame-like radius arms 12 are capable of independent vertical adjustments and they will keep the pinions 8 always in proper mesh with the coöperating gears 9, because the said frames 12 not only move pivotally on the axle casing 7, but oscillate on the axes of the respective traction wheels. Also the said frames or radius arms 12 are of such truss construction that they securely hold the traction wheels against lateral movements.

In this preferred construction, lever-acting cantaliver springs 13 are intermediately pivoted to the inner pivoted ends of the respective radius arms 12, at 14, and, at their rear ends, said springs are pivotally attached to lugs 15 (see Fig. 2), that depend from the rear end portions of the said radius arms. At their front ends, the springs 13 are attached pivotally or otherwise to vertically adjustable abutments in the form of vertically movable rack bars 16 that are mounted to move vertically through guide brackets 18 on laterally projecting portions 4ª of the frame 4. The teeth of these rack bars 16 mesh with pinions 19 secured to a transverse shaft 20, (see Figs. 1 and 2) journaled on suitable bearings in the main frame 4 and brackets 18. Here it is important to note that one of the rack bars 16 is ahead of its coöperating pinion 19, while the other is at the rear of its coöperating pinion (see Fig. 1). With this arrangement of racks and pinions, when the shaft 20 is rotated in a definite direction, one of the racks will be raised and the other will be lowered. Obviously, when, for example, the left-hand rack 16 is raised, the left-hand traction wheel will be lowered, or more accurately stated, the main frame of the tractor will be oscillated so that if the left-hand traction wheel is then run in a furrow, the main frame can be leveled up and both of the traction wheels set in vertical planes. In the arrangement described, the spring 13 acts as a yielding arm extended forward from the respective radius arm or lever.

For rotating the shaft 20 in either direction, at will, and for locking the same where set, said shaft is shown with a worm gear 21 that meshes with a worm 22 on a wheel-equipped rod 23 suitably mounted on the main frame.

The front end portion of the tractor frame is supported, preferably, by a front axle of novel construction and comprising a pair of parallel transverse axle bars 24 located, one over the other, and intermediately pivoted at 25 to a bracket 26 of the main frame. At their ends, the axle bars 24 are pivotally connected at 27 to axle caps 28, which, in turn, are connected by vertical pivots 29 to the fork ends of stub axles 30, upon which latter the front wheels 31 are journaled. The axles 30, as shown, have rearwardly projected arms 32 connected by a cross rod 33. One of the stub axles 30 is provided with an arm 34 that is connected to the thrust rod 35 of the customary steering connection, the remaining portion of which is indicated as an entirety by the numeral 36. The steering operation is too well known to require a further comment, either as to detail of construction or operation.

In Fig. 2, 16ª indicates a cross beam intermediately pivoted to the lower central portion of the frame casting 4 and its ends are attached to the lower ends of the rack bar 16. This cross bar is not an essential feature, but assists in guiding and holding the lower ends of the rack bars for approximate vertical movements.

With rigid levers instead of the springs 13, the above described adjustments of the wheels would be accomplished, but there would be no spring action, unless other provision was made therefor. In the arrangement described, the spring action is contained in the levers themselves. Obviously, the above described arrangement affords simple and highly efficient means for adjusting wheels, so that the body of the tractor will stand level, regardless of whether the tractor is running on level ground or with one wheel in a furrow.

Certain other parts of the tractor, which constitute no part of the invention, may be briefly noted as follows, to wit: the radiator 37, the operator's seat 38, and the clutch and brake pedals 39 and 40.

What I claim is:—

1. In a tractor, the combination with a main frame having a divided transverse jack shaft, the sections of which are provided with pinions at their outer ends, frame-like radius arms mounted for vertical pivotal movements around the axis of said jack shaft, traction wheels journaled to the free rear portions of said radius arms and having internal gears meshing with said pinions, a transverse adjusting shaft provided at the opposite sides of the main frame with pinions, vertically movable racks, the one engaging the front side of one of the pinions on said adjusting shaft and the other engaging the rear side of the other of said pinions, connections between said racks and said radius arms for simultaneously imparting reverse vertical adjustments thereto, and means for rotating and locking said adjusting shaft.

2. In a tractor, the combination with a main frame, of a divided transverse jack shaft, casings surrounding the sections of said jack shaft and affixed to said main frame, frame-like radius arms pivoted on said shaft casing, traction wheels journaled to said radius arms, pinions on the end of the sections of said jack shaft, internal gears carried by said traction wheels and meshing with said pinions, spring levers extended forward from said radius arms, and means for adjusting vertically the front ends of said spring arms.

In testimony whereof I affix my signature in presence of two witnesses.

LOUIS C. ERBES.

Witnesses:
 CLARA DEMAREST,
 EVA E. KÖNIG.

Copies of this patent may be obtained for five cents each, by addressing the "Commissioner of Patents, Washington, D. C."